Patented July 8, 1930

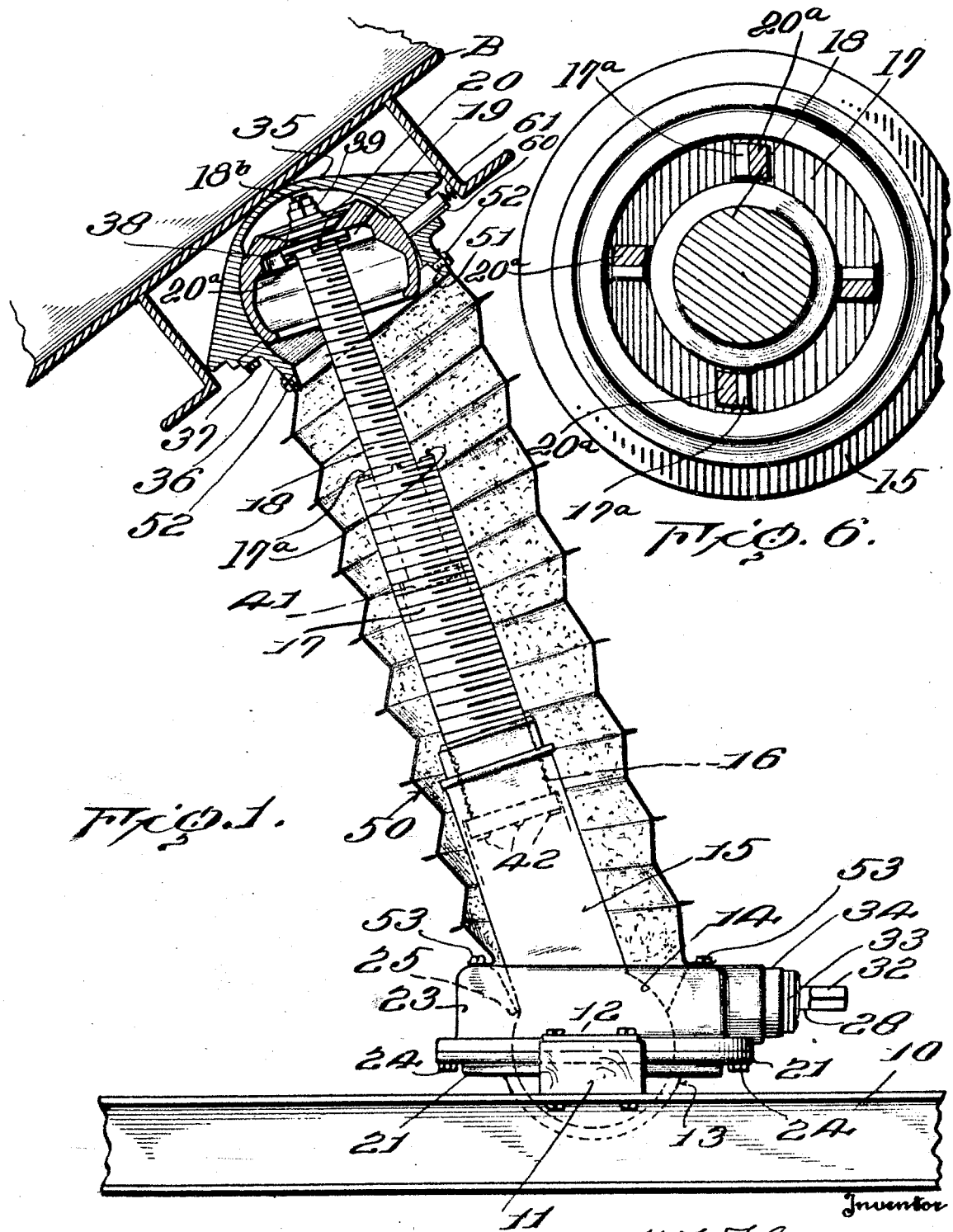

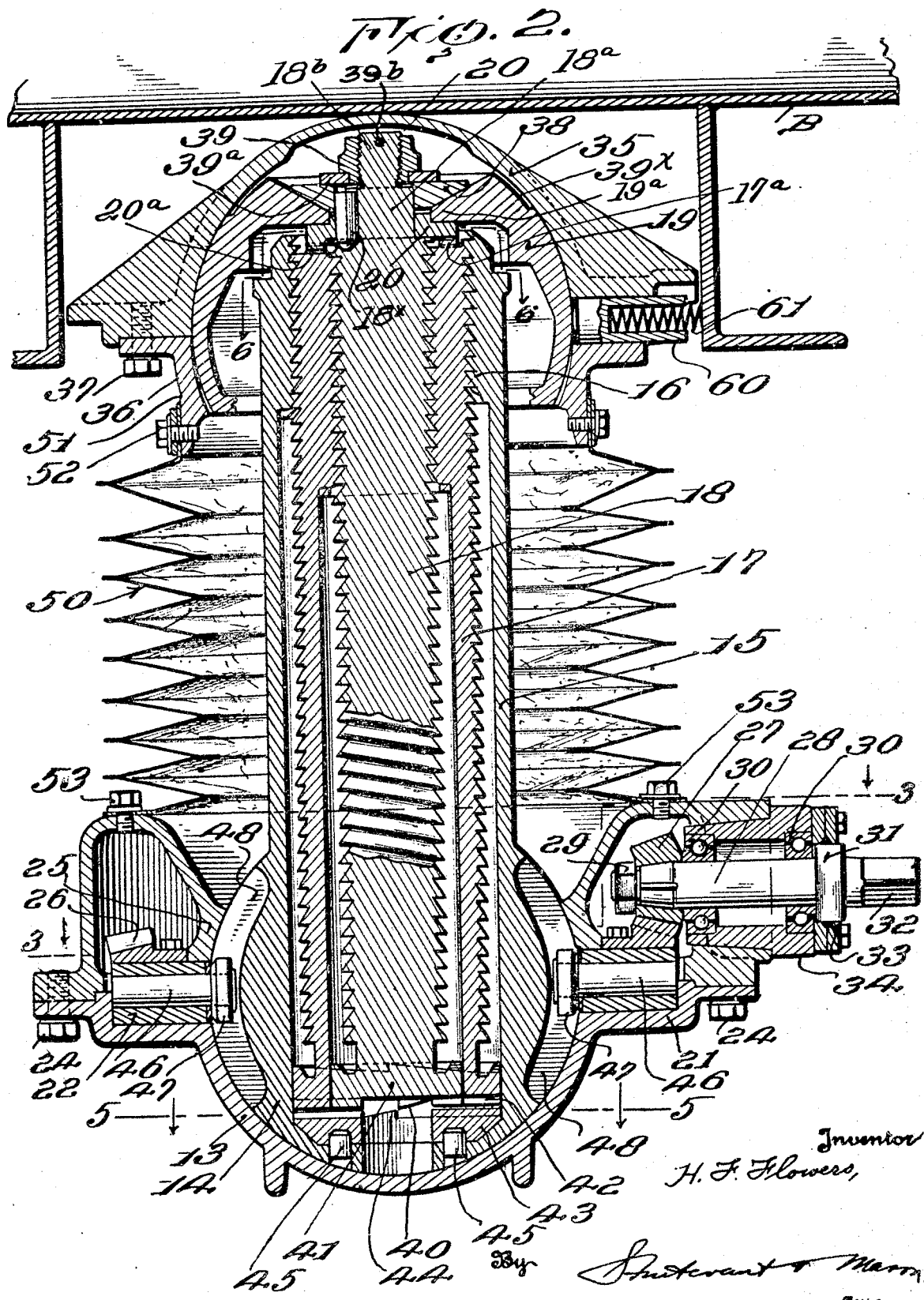

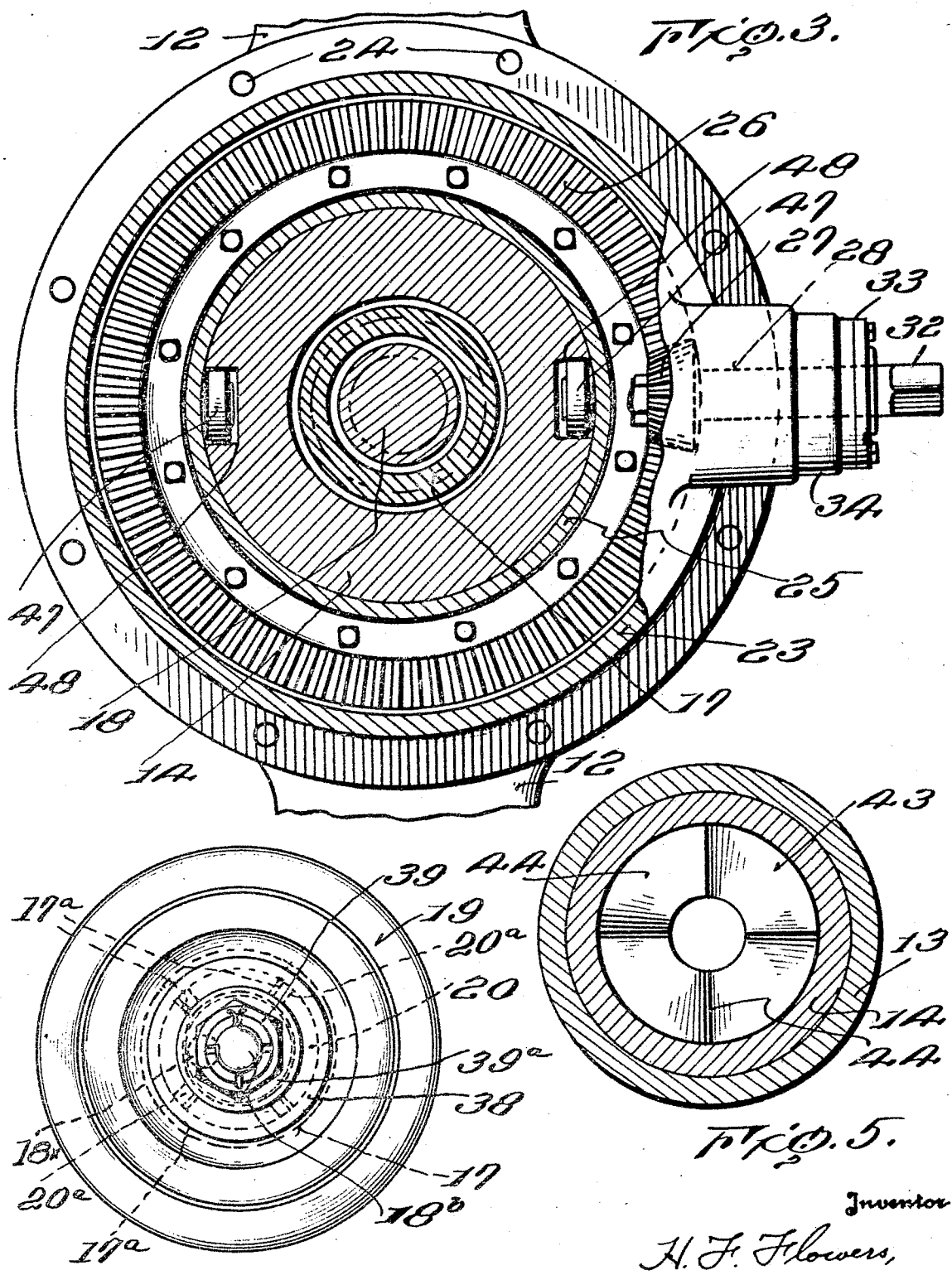

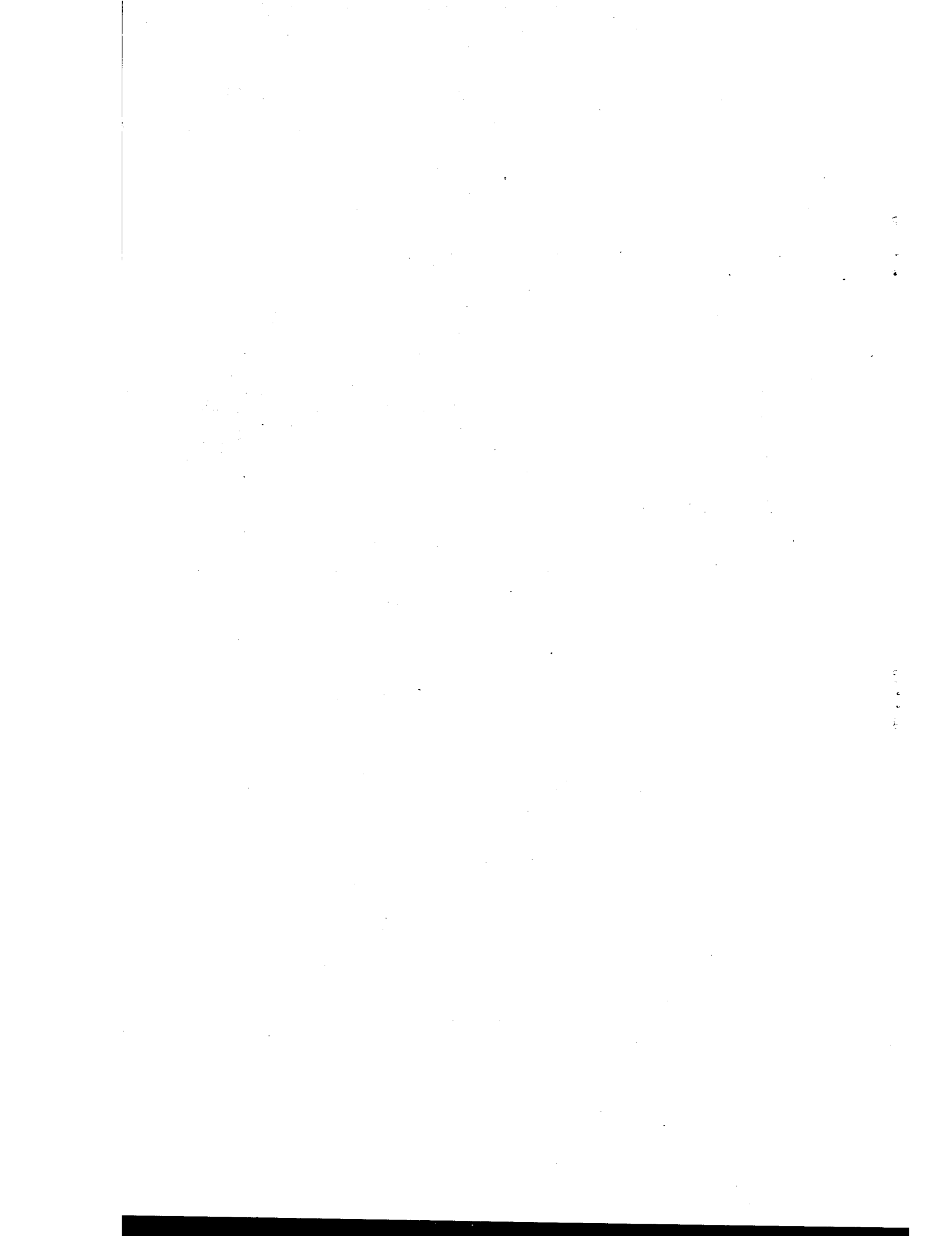

1,770,265

UNITED STATES PATENT OFFICE

HENRY FORT FLOWERS, OF FINDLAY, OHIO

SCREW-TYPE RAISING MECHANISM

Application filed December 27, 1926. Serial No. 157,162.

This invention relates to a raising mechanism of the screw type which is particularly adapted for use with three-way dump vehicles.

The structure according to the present application is a modification of that described in my copending application Serial No. 150,329, filed November 23, 1926.

In the illustrative form of the present invention an extension screw is located between the frame and the tiltable body of the dump vehicle and provided at its ends with balls which are received in hollow sockets respectively secured to the frame and to the body so that the screw automatically adjusts itself to the changing angles and relations of the body with respect to the frame, during movements for lateral or end dumping. According to the present invention, the drive shaft by which the screw is caused to extend and contract is fixedly mounted so that its axis remains in a single line. A driving means is provided to rotate the lower ball and therewith provoke an extension of the screw. Automatic relief means are provided so that the device will safeguard itself against injury upon reaching a position of full raising or lowering, and means are presented whereby the screw will immediately retract upon reversal of the direction of drive of the shaft. A dirt jacket is provided to enclose all relatively movable parts so that dirt and dust will not have access to any of the bearing surfaces.

In the drawings, the illustrative form of execution of such a device has been represented, in which:

Figure 1 is a fragmentary section of a vehicle frame and body with a raising mechanism of the present type in the fully extended position, with the dirt jacket in section.

Fig. 2 is a diametrical section through the raising mechanism in its collapsed position, on a larger scale.

Fig. 3 is a horizontal section substantially on the line 3—3 of Fig. 2.

Fig. 4 is an end view of the upper ball, removed from the socket.

Fig. 5 is a sectional view on line 5—5 of Fig. 2, showing a lower stop member.

Fig. 6 is a similar view substantially on line 6—6 of Fig. 2, showing the upper stop members.

In these drawings, the frame 10 has mounted thereon a bridge member 11 which supports the ribs 12 which are formed integrally with the socket 13 for the lower ball 14. This lower ball has an upper casing 15 formed therewith and carrying an internally screw-threaded portion 16 at its upper end for meshing engagement with the external screw threads of a doubly screw-threaded sleeve 17, whose internal screw threads are in mesh with the threaded spindle 18. This threaded spindle at its upper end is rigidly connected to the upper ball 19.

The lower ball 14 is free to rock within the socket 13. An outwardly extending flange 21 of the socket 12 receives the driving ring 22 for rotation with regard thereto, and has an upturned edge to prevent movement of the driving ring in its own plane. A closing collar 23 is firmly secured to and received with a packed joint with regard to the flange 21 by means of the bolts 24; and is provided with an inward downwardly extending portion 25 which presents its edge in guiding relation to the upper surface of the driving ring 22. This driving ring 22 is free to rotate about its axis and is guided by the flanges 21 and 25.

An annular gear ring 26 is fastened to the upper surface of the driving ring 22 and is in mesh with the pinion 27 secured to the end of the driving shaft 28 by means of the nut 29. This driving shaft 28 is supported by suitable ball bearings 30, and has a stop collar 31 which cooperates with one of these bearings and in conjunction with the face of the pinion 27, serves to prevent endwise movement of the shaft. The squared end 32 of the shaft is connected in any suitable and known maner to an extension shaft leading from a gearing so that the shaft may be rotated at a predetermined and selective time and in one or the other direction from a suitable source of power. It is preferred to provide a packing ring 33 on the end of the journal sleeve 34 of the shaft for packing the shaft against the entry of dirt to the ball races.

The upper ball 19 is received in an upper socket 35 of the body B for about half of its volume, it being preferred to cut away the upper portion of the ball at $39^x$ and a part of the socket so that the frictional engagement of the ball with the socket shall occur at large diameters on each. A securing collar 36 is fastened to the upper socket 35 by the bolts 37 and prevents the entire withdrawal of the ball 19 from the socket 35. The inner surface of this collar is of spherical form but is concentric about a point slightly below the center of the spherical surface of the socket 35, so that when the device is entirely collapsed, the upper ball may be slightly withdrawn from contact with its socket 35, whereby any bumping or similar stress against the socket will not be transmitted to the upper ball and thence to the screw spindles and sleeves, thus avoiding an excessive strain on and rupture of the mechanism.

The spindle 18 is provided at its upper end with a reduced portion $18^a$ and a threaded end $18^b$. A disk 20 having downwardly extending teeth $20^a$ thereon is mounted with a tight fit on the portion $18^a$, and presents its teeth $20^a$ into engaging relationship with the lugs $17^a$ on the top of the double-threaded sleeve 17, when the latter approaches its fully collapsed position, and assures it a definite end position of travel in such direction, and ease of starting for its movement in the opposite direction, as shown in Fig. 6. A second disk 38 having a bevelled lower surface likewise fits around the portion $18^a$, and the castellated nut 39, washer $39^a$ and pin $39^b$ serve to hold these disks upon the portion $18^a$. The upper ball 19 has an inwardly extending flange $19^a$ with a bevelled upper surface complementary to the disk 38, so that when the nut 39 is tightened, the disk 38 is forced against the flange $19^a$ this flange is forced against the disk 20, and this disk 20 is in turn forced against the shoulder of the spindle 18, whereby a contact of great frictional resistance to relative rotational movement is produced between the flange $19^a$ and the upper ball 19, and the disks 20 and 38. The disks 20 and 38 are splined to the spindle 18 so as to be immovable therewith in regard to relative rotation, by a pin $18^x$.

At the lower end, a stop is provided by forming the teeth 40 on the end member 41 of the threaded spindle 18. These teeth are preferably beveled and of substantially the same angular pitch as the threads on the spindle itself. Similar teeth 42 are formed on the lower edge of the threaded sleeve 17. A plate 43 is seated within the hollow chamber of the casing 15 adjacent the bottom of the ball 14, and is provided with similarly but oppositely directed teeth 44 on its upper surface to engage successively the teeth 40 and 42 during the downward or relieving rotation of the spindle 18 and the threaded sleeve 17 whereby these are brought to a standstill individually after a slight further relieving rotation from the position shown in Fig. 2. The form of these teeth is shown in Fig. 5. The pins 45 are passed into the ball 14 and the plate 43 to prevent the latter from rotation with respect to the ball itself. Similar teeth are also formed on the upper face of the member 41 and the upper face of the bottom flange of the sleeve 17.

Mounted in the driving ring 22 are the pins 46 which have their axes located substantially in the horizontal plane through the center of the lower ball, and carry at their ends adjacent the ball the rollers 47 which are received within slots 48 formed in the periphery of the ball for that purpose, as shown in Fig. 3. As the driving ring 22 is rotated in one direction or the other, the rollers 47 by their engagement in the slots 48 will cause the ball to rotate with regard to its socket 13. As the ball tilts, the rollers and slots will move relatively to each other and at all times a driving relation with the ball will be maintained, although the shaft 28 remains with its axis in a single line.

A dirt jacket 50 has its upper end rigidly clamped and sealed to the downwardly depending skirt 51 of the collar 36 by means of bolts 52, whereby the entrance of dirt to the space within the jacket is prevented at this point. The lower end of the jacket is similarly rigidly connected to and sealed dirt-tight with respect to the collar 23 by means of a fastening including the bolts 53. It is preferred to form the jacket from a plurality of flat rings arranged coaxially and fastened together alternately at the inner and outer periphery whereby a flexible diaphragm of the so-called "sylphon" type is produced. For clearness only a conventional number of rings have been shown, but it will be understood that the number of such rings will depend upon the flexibility of the material and the distance of extension. This dirt jacket encloses and protects all of the bearing surfaces, including the surface of contact between the upper ball 19 and its socket 35, the several contact surfaces of the screw spindle and sleeve, the contact surface between the lower ball 14 and its socket 13, and the contact surface between the several parts of the driving ring 22 and its rollers 47 and the slots 48 of the lower ball and the guiding flanges 21 and 25. The upper and lower ends of the jacket are held in invariable relation respectively with regard to the body and the frame, and the jacket extends a greater or lesser amount at its respective sides or front and rear, according to the angular position assumed by the screws (see Fig. 1).

A plunger 60 pressed by a spring 61 may be mounted in the upper socket 35, so that its end is forced into contact with the upper ball 19.